Aug. 7, 1934.                    B. R. FUNK                    1,969,602
                        TIRE CHAIN TIGHTENING DEVICE
                        Original Filed Sept. 20, 1932
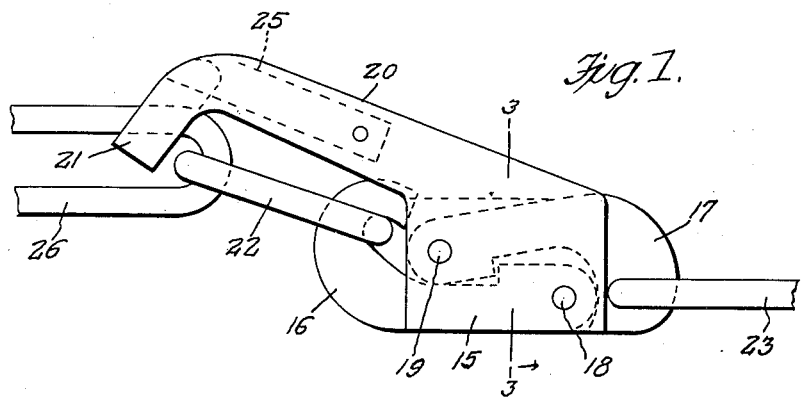
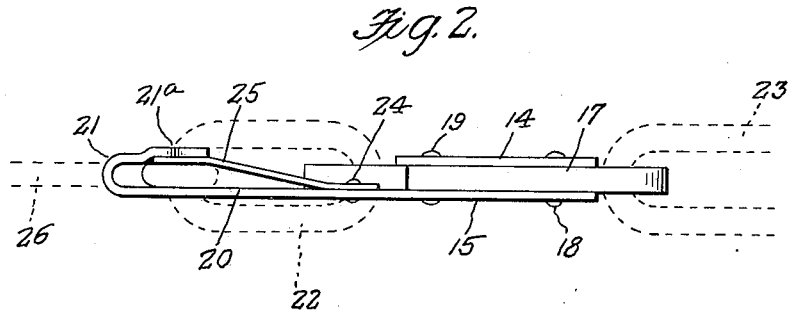
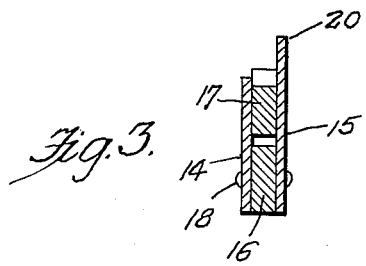
Inventor
Buell R. Funk,
By Clarence A. O'Brien
                        Attorney Patented Aug. 7, 1934

1,969,602

UNITED STATES PATENT OFFICE 1,969,602

TIRE CHAIN TIGHTENING DEVICE

Buell R. Funk, Quinter, Kans.

Original application September 20, 1932, Serial No. 634,068. Divided and this application September 27, 1933, Serial No. 691,210

3 Claims. (Cl. 24—68)

This invention relates to tightening devices of the type employed with tire chains and has as its object to generally improve upon such devices, the present application being a division of my co-pending application Serial No. 634,068, filed September 20, 1932.

In accordance with the present invention, a tire chain tightening device is provided with means whereby the same may be applied to the tire chain in a manner to insure against casual or accidental opening of the tightening device.

The invention, together with its numerous objects and advantages will be best understood from a study of the following description taken in connection with the accompanying drawing wherein is illustrated a preferred embodiment of the invention.

It is to be understood at the outset that it is in nowise intended to restrict the invention to the precise details of construction, combination and arrangement of elements as illustrated and described, other than may be necessary to meet the requirements of the prior art and the scope of the appended claims.

Referring to the drawing:

Figure 1 is a side elevational view of the chain tightening device, illustrating the application thereof.

Figure 2 is a plan view of the tightener.

Figure 3 is a sectional view taken substantially on the line 3—3 of Figure 1.

Referring to the drawing by reference numerals it will be seen that the improved tightener comprises a pair of relatively spaced plates 14, and 15 accommodating therebetween the shanks of hooks 16 and 17.

Drilled through the plates adjacent opposite ends thereof and on opposite sides of median longitudinal lines of said plates are apertures in which are placed pivots 18 and 19. Upon the pivots 18 and 19 are fulcrumed the inner apertured ends of the shanks of hooks 16 and 17. One of the plates, in the present instance plate 15 has secured to one edge thereof, preferably by being integral therewith, a diagonal lever 20 that at its free end has a substantially U-shaped or hook part 21 disposed at substantially right angles to the main body portion of the lever.

The bill of the hook 16 is adapted to detachably engage one of the terminal links 22 of the side chain, while the bill of the hook 17 is provided with an aperture through which is extended the terminal link 23 of said side chain.

The lever 20 has anchored to one side thereof as at 24 one end of a leaf spring 25 and as clearly shown in Figures 1 and 2, the free end of the leaf spring 25 is sprung away from the lever 20 and flatly engages the side 21a of the hook 21 at the free end of said side of the hook.

As shown in Figures 1 and 2 hook 21 of the lever 20 is engaged with the link 26 to which the terminal link 22 is connected when the chain tightener is in its final position on the side chain.

Figures 1 and 2 show the chain tightener in closed position. In manipulating the parts to bring them to the position, shown, it will be apparent that the hook 16 is engaged with the terminal link 22 and the tightening device is then manipulated to bring the hook 21 into engagement with the link 26 which is forced into the hook 21 between the free end of the spring 25 and the side 21a of said hook 21. As soon as the link 26 passes into engagement with the hook 21 the spring 25, due to its inherent resiliency, springs outwardly to the position shown in Figure 2 against the inner face of the side 21a of said hook 21 so that accidental disengagement of the link 26 with the hook 21 is substantially entirely precluded. It will thus be seen that after the anti-skid chain has been contracted and tightened upon the body of the tire, and the parts of the chain tightener are in the position shown in the drawing an accidental opening of the tightener is very unlikely.

What is claimed is:

1. A chain tightener comprising a pair of spaced plates, hooks pivoted at one end between said plates, a lever fixedly secured to one of said plates, and a link engaging hook on the free end of said lever.

2. A chain tightener comprising a pair of plates, a pair of pivots connecting said plates, one pivot of the pair being arranged at one end and at one side of the longitudinal median line of the plates, and the other of said pivots being arranged remote from the first named pivot and on the side of the longitudinal median line of the plates opposite to the first named pivot, hooks having their shanks fulcrumed upon said pivots between said plates, a lever integral with one of said plates, and a link engaging hook on the free end of said lever.

3. In a device of the character described, a pair of plates, a pair of hook members pivoted between said plates, said hook members extending in opposite directions, pivots for said hook members connecting the plates; one of said plates having a lever integral therewith, said lever having a hook on one end thereof, and a spring member anchored to said lever and having a free end bearing against the bill of said hook.

BUELL R. FUNK.